Figure 1:
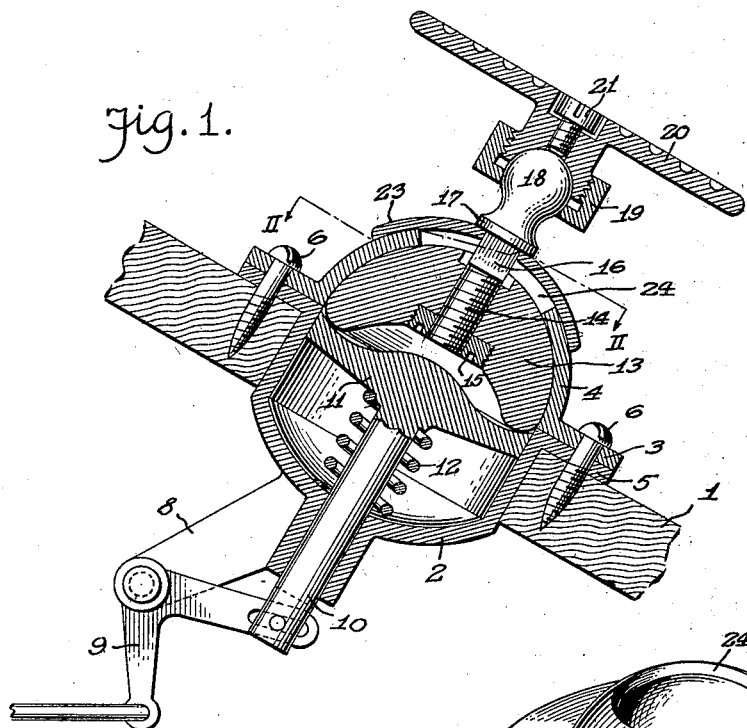

May 20, 1924.  
G. BAILHE  
ACCELERATOR FOR MOTOR VEHICLES  
Filed July 19, 1923  
1,495,063

Inventor  
George Bailhe  
By Homer C. Underwood  
Attorney

Patented May 20, 1924.

1,495,063

UNITED STATES PATENT OFFICE.

GEORGE BAILHE, OF FORT WAYNE, INDIANA.

ACCELERATOR FOR MOTOR VEHICLES.

Application filed July 19, 1923. Serial No. 652,510.

*To all whom it may concern:*

Be it known that I, GEORGE BAILHE, a citizen of the United States of America, residing in the city of Fort Wayne, county of Allen, and State of Indiana, have invented certain new and useful Improvements in Accelerators for Motor Vehicles, of which the following is a specification.

My invention relates to improvements in accelerators for motor vehicles and has for its objects to provide an accelerator simple in construction, easily assembled and adjusted to meet varying conditions of installation in motor vehicles now in use, and especially to provide practical means for resting the foot against the foot-pedal in whatever position of operation the accelerator may be and without changing the opening of the throttle to the carburetor, and also to provide against unintended acceleration of the vehicle by sudden pressure against the foot-pedal where the operator might mistakingly believe he is applying the brake.

With the foregoing and other objects in view, I will describe the means by which said objects are attained, referring to the drawings forming a part of my specification, and using reference numerals to indicate the several parts.

Fig. 1, is a vertical section, showing my accelerator applied to the floor-board of a motor vehicle.

Figure 3:
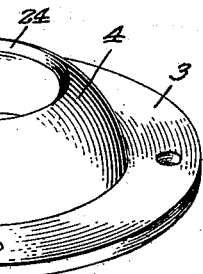
Figure 2:
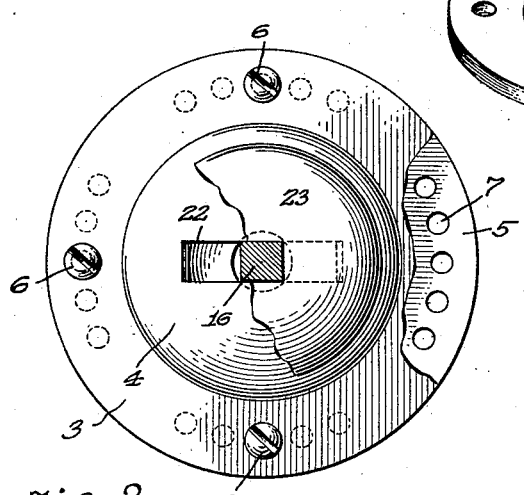

Fig. 2, is a plan view of the top plate with parts cut away to show the apertures in the casing for attachment of the casing in joining the cover plate shown in Fig. 3, to the casing, and a modified form of the cover plate, in this instance being provided with a slot in lieu of the orifice in the dome portion of the plate shown in Fig. 3. Part of the dome of the cover plate in Fig. 2 being cut away to show a section of Fig. 1, on line II—II.

Fig. 3, is a perspective view of my cover plate, showing my preferred form of plate.

In the accompanying drawings, 1, is the floor-board of a motor vehicle, in which is set a casing, 2, with the flange 5 thereof resting on the floor-board. Over the casing a plate, 3, is set and which is provided with a dome portion, 4. The plate and casing are secured together by screws, 6. The flange of the casing is provided with numerous perforations, 7, so the casing may be adjusted to different positions carrying with it the arm 8, which may be integral with the casing. In installing my accelerator in different makes of motor vehicles, it may be necessary to change the angle or direction of the arm, 8, and the bell-crank, 9, pivoted thereon, to make proper connection with the line running to the throttle of the carburetor, hence the casing may be turned and secured to the floor-board through any of the perforations, 7, of the flange, 5. Within the casing is a piston, 10, having a head, 11, raised in the center. The stem of the piston extends through the bore in the lower end of the casing. To the lower end of the piston the bell-crank 9, or other suitable mechanism running to the throttle of the carburetor, through its connections, is secured. Between the head of the piston and the inner surface of the casing, is interposed a spring, 12, which surrounds the stem of the piston and provides a resilient support for the piston. Above the piston-head is a cam member adapted to actuate the piston when its lower surface is turned against the piston-head. This cam member, 13, has a spherical outer surface to conform to the shape of the inner surface of the dome portion 4, of the plate 3, and is cut away above the piston head to form a clearance between it and the piston-head. A stem, 14, threaded at its lower end, is secured to the cam member by a nut, 15, and the stem is squared at 16, immediately above which is a flange, 17, and the stem terminates in a spherical head, 18, on which is mounted a member 19 which is interially threaded to receive the foot-pedal, 20 which is held in place by a countersunk-set-screw, 21. It will be apparent that the foot-pedal may be set at varying angles by loosing the set-screw 21 and turning the foot-pedal on the spherical head, 18, of the stem 16. The dome of the plate, 3, is apertured centrally when it is desired to tilt the foot-pedal in any direction to operate the piston, or it may be slotted as shown in Fig. 2, at 22, if it is desired to confine the tilting of the foot-pedal to only two directions. A cap, 23, is mounted around the squared section 16 of the stem 14 and immediately beneath the flange 17. This cap serves to keep foreign matter from entering through the aperture, 24, in the dome of the plate 3 and also to resist downward pressure on the foot-pedal, and may be adjusted in relation to its contact with the outer surface of the dome of said plate by turning the threaded stem, 14.

From the foregoing description, and the drawings, the operation of my accelerator will be readily understood. It will be seen from Fig. 1, that the piston can not be operated by downward pressure or motion of the foot-pedal, because the cap 23 will resist and prevent any downward motion of the foot-pedal, but if the foot-pedal be tilted in any direction the cam member 13 will press downward on the piston-head, driving it downward and actuating the throttle. If the foot is removed from the foot-pedal, or the operator rights it to central position, the spring 12 will return the piston to its normal position. If the form of plate 3 shown in Fig. 2, be used, the same operation results except that in that event the foot-pedal can only be tilted in two directions.

Having fully described my invention, and its mode of operation, what I claim is:

1. In an accelerator for motor vehicles, a casing, a piston within the casing and having a head raised in the center, a resilient support for the piston, a cam operable against the piston-head, a foot-pedal, means for connecting the foot-pedal to the cam member, a plate secured to the casing and apertured at its center and a cap secured to the connecting means aforesaid and adapted to cover said aperture and resist downward pressure upon the foot-pedal.

2. In an accelerator for motor vehicles, a casing, a plate apertured at its center and secured to the casing, a piston within the casing, means for actuating the piston, a cap secured to said actuating means and adapted to cover said aperture.

3. An accelerator for motor vehicles having the characteristics set forth in claim 2 hereof, and means for adjusting the plate in relation to the casing.

4. In an accelerator for motor vehicles, a casing, a plate secured to the casing and apertured at its center, a piston within the casing, a member operable against the piston to impart movement thereto, a foot-pedal connected to said piston-actuating member, and means adapted to cover said aperture in said plate and resist downward pressure on the foot-pedal.

5. In an accelerator for motor vehicles, a casing, a plate secured to the casing and apertured at its center, a piston within the casing, a cam operable against the piston to impart movement thereto, a foot-pedal, a stem on which the foot-pedal is mounted, means for adjusting the foot-pedal in relation to the stem, a cap secured to the stem adapted to cover said aperture in the plate and resist downward pressure on the foot-pedal, and means for connecting the stem to the cam.

6. In an accelerator for motor vehicles, a casing, a plate secured to the casing, a dome on the plate, a slot in the dome, a stem operable in the slot, a foot-pedal secured to the stem, a piston within the casing, means connected to the stem and adapted to actuate the piston, and means to prevent downward motion of the stem.

7. An accelerator for motor vehicles having the characteristics set forth in claim 5 hereof, and means for adjusting the cam in relation to the cap.

Signed at Fort Wayne, county of Allen, State of Indiana, this 28th day of May, 1923, in the presence of two subscribing witnesses.

GEORGE BAILHE.

Witnesses:
ANNA WAMBAUGH,
EDITH C. LABBE.